United States Patent
Choi

(10) Patent No.: US 12,078,553 B2
(45) Date of Patent: Sep. 3, 2024

(54) TEMPERATURE SENSOR AND METHOD FOR CONTROLLING THE TEMPERATURE SENSOR

(71) Applicant: SK hynix Inc., Icheon-si (KR)

(72) Inventor: Suk Hwan Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/495,542

(22) Filed: Oct. 26, 2023

(65) Prior Publication Data
US 2024/0053207 A1 Feb. 15, 2024

Related U.S. Application Data

(62) Division of application No. 17/094,446, filed on Nov. 10, 2020, now Pat. No. 11,815,409.

(30) Foreign Application Priority Data

Jun. 10, 2020 (KR) ........................ 10-2020-0070071

(51) Int. Cl.
*G01K 7/00* (2006.01)
*G01K 7/02* (2021.01)
*G01K 7/16* (2006.01)

(52) U.S. Cl.
CPC .............. *G01K 7/16* (2013.01); *G01K 7/021* (2013.01)

(58) Field of Classification Search
CPC .......... G01K 7/01; G01K 3/005; G01K 7/015; G01K 7/425; G01K 7/16; G01K 7/021; G01K 15/005; G01K 7/00; G01K 2219/00; G01K 1/02
See application file for complete search history.

(56) References Cited

U.S. PATENT DOCUMENTS

| 5,608,347 A | 3/1997 | Kearney |
| 5,811,808 A | 9/1998 | Cannata et al. |
| 7,378,999 B1 | 5/2008 | McGrath et al. |
| 9,715,913 B1 | 7/2017 | Yin et al. |
| 9,843,337 B1 | 12/2017 | Li et al. |
| 10,983,546 B1 | 4/2021 | Grave et al. |
| 2004/0178846 A1 | 9/2004 | Kuyel et al. |

(Continued)

FOREIGN PATENT DOCUMENTS

| CN | 101162604 A | 4/2008 |
| CN | 102545911 B | 11/2014 |

(Continued)

OTHER PUBLICATIONS

18495542_2024-05-06_JP_3732884_B2_H.pdf,Jan. 11, 2006.*

*Primary Examiner* — Gail Kaplan Verbitsky
(74) *Attorney, Agent, or Firm* — WILLIAM PARK & ASSOCIATES LTD.

(57) ABSTRACT

A temperature sensor and a method of controlling the temperature sensor are provided. The temperature sensor includes a voltage generator suitable for generating a temperature voltage that has a voltage level determined according to a temperature and a reference voltage that has a constant voltage level independent of a change in temperature, a code generator suitable for generating an initial code based on the temperature voltage and the reference voltage, and a code calibrator suitable for generating a calibrated code based on the initial code and a calibration factor.

5 Claims, 7 Drawing Sheets

(56) References Cited

U.S. PATENT DOCUMENTS

| | | |
|---|---|---|
| 2007/0173220 A1 | 7/2007 | Kim et al. |
| 2008/0027667 A1 | 1/2008 | Petersen et al. |
| 2008/0091378 A1 | 4/2008 | Jeong et al. |
| 2009/0063081 A1 | 3/2009 | Xu |
| 2010/0026383 A1 | 2/2010 | Ahrari et al. |
| 2010/0110815 A1 | 5/2010 | Lee et al. |
| 2013/0147544 A1* | 6/2013 | Kim ................ G05F 3/242 323/313 |
| 2013/0147545 A1* | 6/2013 | Kim ............. G11C 29/12005 327/541 |
| 2013/0169354 A1* | 7/2013 | Hong ............... G11C 5/147 327/540 |
| 2013/0315019 A1* | 11/2013 | Kim .................. H03L 1/027 365/222 |
| 2014/0055179 A1 | 2/2014 | Gong et al. |
| 2014/0275890 A1 | 9/2014 | Meehan et al. |
| 2014/0368249 A1 | 12/2014 | Lee |
| 2015/0211939 A1 | 7/2015 | Hyun et al. |
| 2017/0254707 A1 | 9/2017 | Hyun et al. |
| 2018/0018913 A1 | 1/2018 | Kim et al. |
| 2018/0061465 A1 | 3/2018 | Jeter et al. |
| 2019/0170592 A1 | 6/2019 | Jeong et al. |
| 2019/0348086 A1 | 11/2019 | Ku et al. |
| 2019/0368947 A1 | 12/2019 | Hurwitz |
| 2019/0371372 A1 | 12/2019 | Kim et al. |
| 2021/0223809 A1 | 7/2021 | Hunt-Schroeder et al. |
| 2021/0310876 A1* | 10/2021 | Jeong ................ H03F 3/45475 |
| 2021/0397362 A1* | 12/2021 | Kim ................... G11C 29/028 |

FOREIGN PATENT DOCUMENTS

| | | | |
|---|---|---|---|
| CN | 104166421 A | 11/2014 | |
| CN | 106873703 A | 6/2017 | |
| CN | 109870242 A | 6/2019 | |
| CN | 110460306 A | 11/2019 | |
| CN | 110954248 A | 4/2020 | |
| CN | 109084931 B | 5/2020 | |
| JP | 3732884 B2 * | 1/2006 | ............ G05F 1/465 |
| KR | 100691374 B1 | 3/2007 | |
| KR | 1020100020146 A | 2/2010 | |
| KR | 1020150089446 A | 8/2015 | |
| KR | 1020170059703 A | 5/2017 | |
| KR | 102048230 B1 | 11/2019 | |
| RU | 2399156 C1 | 9/2010 | |

* cited by examiner

TEMPERATURE SENSOR AND METHOD FOR CONTROLLING THE TEMPERATURE SENSOR

CROSS-REFERENCE TO RELATED APPLICATION

The present application is a divisional application of U.S. patent application Ser. No. 17/094,446, filed on Nov. 10, 2020, and claims priority under 35 U.S.C. § 119(a) to Korean patent application number 10-2020-0070071, filed on Jun. 10, 2020, in the Korean Intellectual Property Office, the entire disclosure of which is incorporated herein by reference.

BACKGROUND

1. Technical Field

Various embodiments generally relate to an electronic device, and more particularly, to an electronic device having a temperature sensor and a controlling method of the electronic device.

2. Related Art

Memory devices may store data. Memory devices are generally classified as volatile memory devices or nonvolatile memory devices. Volatile memory devices lose stored data in the absence of supplied power. Volatile memory devices may include, for example, Static RAM (SRAM), Dynamic RAM (DRAM) and/or Synchronous DRAM (SDRAM).

Nonvolatile memory devices retain stored data in the absence of supplied power. Examples of nonvolatile memory devices include a flash memory device, a Read Only Memory (ROM) device, a Programmable ROM (PROM) device, an Electrically Programmable ROM (EPROM) device, an Electrically Erasable and Programmable ROM (EEPROM) device, a Phase-change RAM (PRAM) device, a Magnetic RAM (MRAM) device, a Resistive RAM (RRAM) device, and a Ferroelectric RAM (FRAM) device. Flash memories are generally classified as NOR-type memories or NAND-type memories.

Memory devices may include a Digital Temperature Sensor (DTS) providing temperature information for optimal performance of the memory device. Because the temperature information provided from the DTS is for optimization of the memory device, the temperature information provided should have high accuracy.

However, errors may exist in which chips do not output the same code with respect to the same temperature due to variables generated by an analog circuit for generating a voltage according to a temperature, an Analog to Digital Converter (ADC) for converting the generated voltage into a digital signal, and a peripheral circuit in the DTS. The errors may generally occur in two types, that is, offset errors and gain errors. Generally, these two types of errors may simultaneously occur.

SUMMARY

According to an embodiment, a temperature sensor may include a voltage generator suitable for generating a temperature voltage that has a voltage level determined according to a temperature and a reference voltage that has a constant voltage level independent of a change in temperature, a code generator suitable for generating an initial code based on the temperature voltage and the reference voltage, and a code calibrator suitable for generating a calibrated code based on the initial code and a calibration factor.

According to an embodiment, a method of controlling a temperature sensor may include generating a temperature voltage that has a voltage level determined according to a temperature and a reference voltage, wherein the reference voltage has a constant voltage level independent of a change in temperature. The method may also include generating an initial code based on the temperature voltage and the reference voltage, and generating a calibrated code based on the initial code and a calibration factor.

According to an embodiment, a method of controlling a temperature sensor may include generating a first test code based on a voltage level sensed at a first temperature, generating a second test code based on a voltage level sensed at a second temperature lower than the first temperature, calculating a gain trim amount, after calculating a range of the first test code and the second test code, based on the calculated range, and calculating an offset trim amount by comparing the first test code with a first target code predetermined according to the first temperature.

According to an embodiment, a memory device for performing an internal operation on an included memory cell, the memory device may include a voltage generator suitable for measuring an internal temperature of the memory device and generating a temperature voltage that has a voltage level determined according to the internal temperature and a reference voltage that has a constant voltage level independent of a change in temperature, a code generator suitable for generating an initial code based on the temperature voltage and the reference voltage and a code calibrator suitable for generating a calibrated code based on the initial code and a calibration factor.

According to an embodiment, a temperature sensor suitable for generating a digital code indicating a temperature of a memory device, the temperature sensor may include a voltage generator suitable for generating a temperature voltage having a voltage level determined according to the temperature of the memory device and a reference voltage having a constant voltage level independent of a change in temperature of the memory device, a code generator suitable for generating an initial code based on the temperature voltage and the reference voltage, wherein the initial code is a digital code, and a code calibrator suitable for generating, when the temperature sensor is in a user mode, a calibrated code based on the initial code and a calibration factor, wherein the calibrated code is a digital code, and wherein the calibration factor is determined when the temperature sensor is in a test mode.

DETAILED DESCRIPTION

Hereinafter, specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

It is also noted that in this specification, "connected/coupled" refers not only to embodiments of one component directly connected/coupled to another component but also to embodiments of the one components indirectly connected/coupled to the other component through an intervening component. In the specification, when an element is referred to as "comprising" or "including" a component, it does not exclude other components but may further include other components unless a description to the contrary is specifically pointed out in context.

Various embodiments are directed to a temperature sensor capable of calibrating errors that occur in a process of generating temperature information and a controlling method of the temperature sensor.

Figure 1:
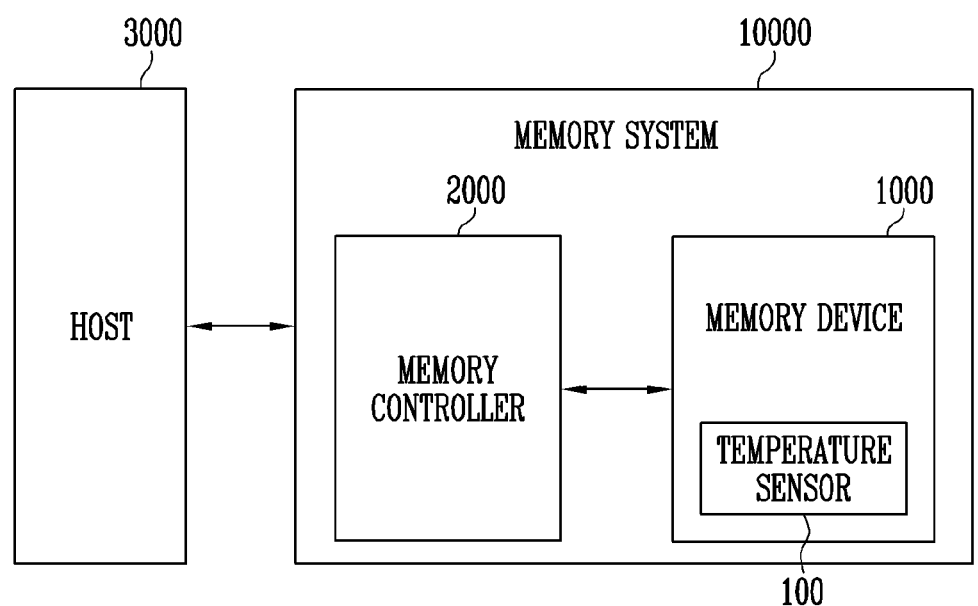
FIG. 1 is a diagram illustrating a memory system according to an embodiment.

FIG. 1 is a diagram illustrating a memory system 10000 according to an embodiment.

Referring to FIG. 1, the memory system 10000 may include a memory device 1000 and a memory controller 2000.

The memory system 10000 may be a device storing data in response to control of a host 3000. Examples of the host 3000 may include a cellular phone, a smartphone, an MP3 player, a laptop computer, a desktop computer, a game player, a tablet PC, or an in-vehicle infotainment system.

The memory system 10000 may be configured as one of various types of storage devices according to a host interface corresponding to a communication method with the host 3000. For example, the memory system 10000 may be configured as one of various types of storage devices, such as: a solid state drive (SSD); a multimedia card in the form of a multimedia card (MMC), an eMMC, an RS-MMC, and a micro-MMC; a secure digital card in the form of an SD, a mini-SD, and a micro-SD; a universal serial bus (USB) storage device; a universal flash storage (UFS) device; a personal computer memory card international association (PCMCIA) card type storage device; a peripheral component interconnection (PCI) card type storage device; a PCI express (PCI-E) card type storage device; a compact flash (CF) card; a smart media card; and a memory stick.

The memory system 10000 may be manufactured as one of various types of packages. For example, the memory system 10000 may be manufactured as one of a package on package (POP), a system in package (SIP), a system on chip (SOC), a multi-chip package (MCP), a chip on board (COB), a wafer-level fabricated package (WFP), and a wafer-level stack package (WSP).

The memory device 1000 may store data. The memory device 1000 may operate in response to control of the memory controller 2000. In addition, the memory device 1000 may include a memory cell array including a plurality of memory cells storing data. Each of the memory cells may be configured as a Single-Level Cell (SLC) storing one bit of data, a Multi-Level Cell (MLC, hereinafter, MLC) storing two bits of data, a Triple-Level Cell (TLC, hereinafter, TLC) storing three bits of data, or a Quad-Level Cell (QLC) storing four bits of data.

The memory cell array may include a plurality of memory blocks and each of the memory blocks may include a plurality of memory cells. In addition, each of the memory blocks may include a plurality of pages. According to an embodiment, a page may be a unit for storing data in the memory device 1000 or reading data stored in the memory device 1000. A memory block may be a unit for erasing data.

According to an embodiment, the memory device 1000 may be embodied as one of Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, Vertical NAND flash memory, NOR flash memory, resistive random access memory (RRAM), phase-change memory (PRAM), magnetoresistive random access memory (MRAM), ferroelectric random access memory (FRAM), or spin-transfer torque random access memory (STT-RAM). For convenience of explanation, it is assumed that the memory device 1000 is a NAND flash memory device in the context of the following description. However, embodiments are not limited thereto, and the memory device 1000 may be embodied as various memory devices.

The memory device 1000 may be a NAND flash memory device. The memory device 1000 may receive a command and an address from the memory controller 2000. The memory device 1000 may be configured to access an area selected by the received address in the memory cell array. Accessing the selected area may refer to performing an operation corresponding to the received command on the selected area. For example, the memory device 1000 may perform a write operation (or a program operation), a read operation, and an erase operation. During a program operation, the memory device 1000 may program the area selected by the address with data. During a read operation, the memory device 1000 may read data from the area selected by the address. During an erase operation, the memory device 1000 may erase data stored in the area selected by the address.

According to another embodiment, the memory device 1000 may be a dynamic random access memory (DRAM) device. The memory device 1000 may receive a command and an address from the memory controller 2000. The memory device 1000 may be configured to access an area selected by the received address in the memory cell array. Accessing the selected area may refer to performing an operation corresponding to the received command on the selected area. For example, the memory device 1000 may perform a data input/output operation or a refresh operation. The data input/output operation of the memory device 1000 may be for receiving data to store the data in the area selected by the address or for outputting and reading the stored data. The refresh operation of the memory device 1000 may be for preserving the stored data.

The memory device 1000 may include a memory cell. The memory device 1000 may perform an internal operation on the memory cell in response to control of the memory controller 2000. The internal operation on the memory cell may include at least one of a program operation, a read operation, and an erase operation. According to another embodiment, the internal operation on the memory cell may include at least one of a data input/output operation and a refresh operation.

The memory controller 2000 may control general operation of the memory system 10000. When power is applied to the memory system 10000, the memory controller 2000 may execute firmware (FW). The FW may include a Host Interface Layer (HIL) receiving a request input from the host 3000 or outputting a response to the host 3000, a Flash Translation Layer (FTL) managing an operation between an interface of the host 3000 and an interface of the memory device 1000, and a Flash Interface Layer (FIL) providing a command to the memory device 1000 or receiving a response from the memory device 1000.

The memory controller 2000 may receive data and a Logical Address (LA) from the host 3000 and translate the LA into a Physical Address (PA) indicating an address of memory cells where the data is stored in the memory device 1000. The LA may be a Logical Block Address (LBA) and the PA may be a Physical Block Address (PBA).

For example, the memory controller 2000 may control the memory device 1000 to perform a program operation, a read operation, or an erase operation in response to a request from the host 3000. During a program operation, the memory controller 2000 may provide a program command, a physical block address, and data to the memory device 1000. During a read operation, the memory controller 2000 may provide a read command and a physical block address to the memory device 1000. During an erase operation, the memory controller 2000 may provide an erase command and a physical block address to the memory device 1000.

Alternatively, the memory controller 2000 may control the memory device 1000 to perform a program operation, a read operation, or an erase operation independent of the request from the host 3000. For example, the memory controller 2000 may control the memory device 1000 to perform a program operation, a read operation, or an erase operation used to perform background operations such as wear leveling, garbage collection, and read reclaim operations.

According to an embodiment, the memory controller 2000 may control a temperature sensor 100 included in the memory device 1000. More specifically, the memory controller 2000 may generate a temperature measurement command and may control the temperature sensor 100 included in the memory device 1000 to sense a temperature of the memory device 1000.

According to an embodiment, as the memory device 1000 performs an internal operation, an internal temperature of the memory device 1000 may vary. The internal temperature may correspond to a temperature of the memory device 1000 or a temperature of the memory cell array. When the frequency with which the memory device 1000 performs internal operations increases, the internal temperature of the memory device 1000 may increase. When the internal temperature of the memory device 1000 excessively increases, the memory device 1000 may be more likely to deteriorate. In other words, because a probability that the internal operation of the memory device 1000 fails increases, performance of the memory device 1000 may deteriorate. Accordingly, the memory controller 2000 may control the temperature sensor 100 to measure a temperature every time when an internal operation of the memory device 1000 is performed. In addition, when the internal temperature excessively increases, the memory controller 2000 may limit the internal operation of the memory device 1000 to decrease the internal temperature of the memory device 1000. The memory controller 2000 may control the memory device 1000 to decrease the internal temperature of the memory device 1000 by limiting the internal operation of the memory device 1000.

The temperature sensor 100 may be embodied as a digital temperature sensing circuit to convert a temperature into a code CODE which is a digital signal and output the code CODE. More specifically, the temperature sensor 100 may output a code corresponding to a temperature and may transfer the output code to the memory device 1000 or the memory controller 2000.

In addition, the temperature sensor 100 may sense a temperature of the memory device 1000 or the memory system 10000 and output a code corresponding to the sensed temperature in response to a command (for example, a temperature measurement command) transferred from the memory device 1000 or the memory controller 2000. Alternatively, the temperature sensor 100 may sense a temperature of the memory device 1000 or the memory system 10000 and output a code at a predetermined time independent of a command transferred from the memory device 1000 or the memory controller 2000. More specifically, the temperature sensor 100 may perform an operation of sensing a temperature and outputting a code according to a predetermined cycle. The memory device 1000 or the memory controller 2000 may identify a temperature of the memory device 1000 or the memory system 10000 based on a code output from the temperature sensor 100.

The host 3000 may communicate with the memory system 10000 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), NonVolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Meanwhile, FIG. 1 illustrates a configuration in which the temperature sensor 100 is included in the memory device 1000. However, this configuration corresponds to one embodiment. According to another embodiment, the temperature sensor 100 may be attached to the memory device 1000 or a single temperature sensor 100 may be coupled to a plurality of memory devices 1000. Alternatively, the temperature sensor 100 may be configured as a separate electronic device from the memory device 1000.

Figure 2:
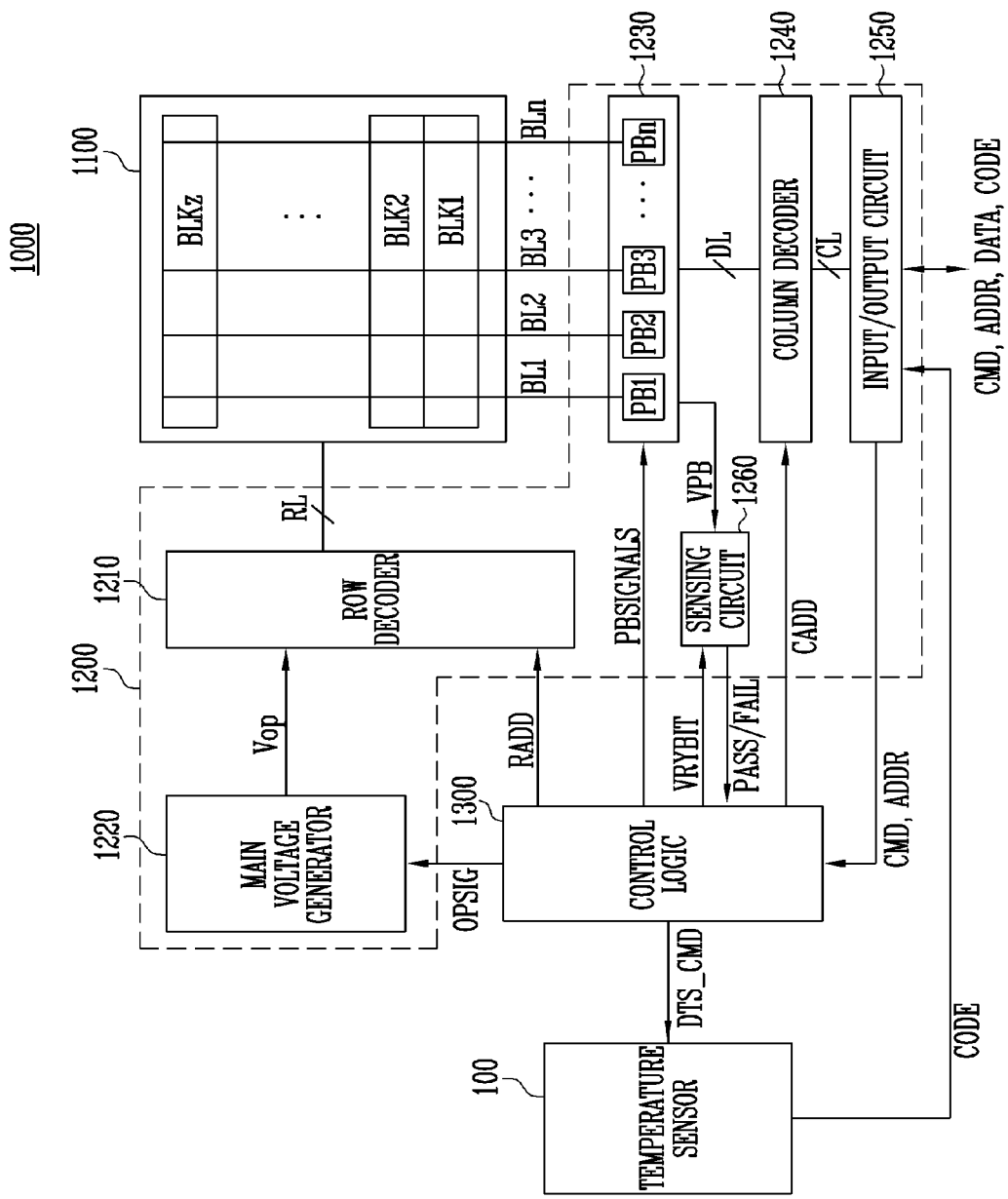
FIG. 2 is a diagram illustrating a memory device according to an embodiment.

FIG. 2 is a diagram illustrating the memory device 1000 according to an embodiment.

Referring to FIG. 2, the memory device 1000 may include a memory cell array 1100, a peripheral circuit 1200, control logic 1300, and the temperature sensor 100. For convenience of explanation, it is assumed that the memory device 1000 shown in FIG. 2 is a NAND flash memory device in the context of the following description. However, embodiments are not limited thereto, and the memory device 1000 may be embodied as various memory devices.

The memory cell array 1100 may include a plurality of memory blocks BLK1 to BLKz. The plurality of memory blocks BLK1 to BLKz may be coupled to a row decoder 1210 through row lines RL. The plurality of memory blocks BLK1 to BLKz may be coupled to a page buffer group 1230 through bit lines BL1 to BLn. Each of the plurality of memory blocks BLK1 to BLKz may include a plurality of memory cells. According to an embodiment, the plurality of memory cells may be nonvolatile memory cells. Memory cells coupled to the same word line may be defined as one page. In other words, the memory cell array 1100 may include a plurality of physical pages. Therefore, each memory block may include a plurality of pages.

Each of the memory cells included in the memory cell array 1100 may include the SLC storing one bit of data, the MLC storing two bits of data, the TLC storing three bits of data, or the QLC storing four bits of data.

The peripheral circuit 1200 may be configured to perform a program operation, a read operation, or an erase operation on a selected area of the memory cell array 1100 in response to control of the control logic 1300. The peripheral circuit 1200 may drive the memory cell array 1100. For example, the peripheral circuit 1200 may apply various operating voltages to the row lines RL and the bit lines BL1 to BLn or discharge the applied voltages in response to control of the control logic 1300.

The peripheral circuit 1200 may include the row decoder 1210, a main voltage generator 1220, the page buffer group 1230, a column decoder 1240, an input/output circuit 1250, and a sensing circuit 1260.

The peripheral circuit 1200 may drive the memory cell array 1100. For example, the peripheral circuit 1200 may drive the memory cell array 1100 to perform a program operation, a read operation, and an erase operation.

The row decoder 1210 may be coupled to the memory cell array 1100 through the row lines RL. The row lines RL may include at least one source select line, a plurality of word lines, and at least one drain select line. According to an embodiment, the word lines may include normal word lines and dummy word lines. The row lines RL may further include a pipe select line.

The row decoder 1210 may be configured to operate in response to control of the control logic 1300. The row decoder 1210 may receive a row address RADD from the control logic 1300. In addition, the row decoder 1210 may be configured to decode the row address RADD. The row decoder 1210 may select at least one of the memory blocks BLK1 to BLKz according to the decoded address. In addition, the row decoder 1210 may select at least one word line of the selected memory block so as to apply voltages generated by the main voltage generator 1220 to at least one word line WL according to the decoded address.

For example, during a program operation, the row decoder 1210 may apply a program voltage to the selected word line and a program pass voltage having a lower voltage level than the program voltage to unselected word lines. During a program verify operation, the row decoder 1210 may apply a verify voltage to the selected word line and a verify pass voltage having a higher voltage level than the verify voltage to the unselected word lines. During a read operation, the row decoder 1210 may apply a read voltage to the selected word line and a read pass voltage having a higher voltage level than the read voltage to the unselected word lines.

According to an embodiment, an erase operation of the memory device 1000 may be performed in units of memory blocks. During an erase operation, the row decoder 1210 may select one of the memory blocks according to the decoded address. During the erase operation, the row decoder 1210 may apply a ground voltage to word lines coupled to the selected memory block.

The main voltage generator 1220 may operate in response to control of the control logic 1300. The main voltage generator 1220 may be configured to generate a plurality of voltages by using an external power voltage supplied to the memory device 1000. More specifically, the main voltage generator 1220 may generate various operating voltages Vop applied to perform program, read, and erase operations in response to an operation signal OPSIG. For example, the main voltage generator 1220 may generate a program voltage, a verify voltage, a pass voltage, a read voltage, and an erase voltage in response to the control of the control logic 1300.

According to an embodiment, the main voltage generator 1220 may generate an internal power voltage by regulating an external power voltage. The internal power voltage generated by the main voltage generator 1220 may be used as an operating voltage of the memory device 1000. In other words, the main voltage generator 1220 may generate a plurality of voltages by using the external power voltage or the internal power voltage.

For example, the main voltage generator 1220 may include a plurality of pumping capacitors receiving the internal power voltage and generate a plurality of voltages by selectively activating the plurality of pumping capacitors in response to the control of the control logic 1300. The plurality of generated voltages may be supplied to the memory cell array 1100 by the row decoder 1210.

In addition, the main voltage generator 1220 may include a bandgap reference and provide the temperature sensor 100 with a fixed voltage which has a constant voltage level independent of a temperature and a circuit load. In other words, the main voltage generator 1220 may provide the fixed voltage to the temperature sensor 100 such that the temperature sensor 100 generates a code according to a temperature.

Figure 3:
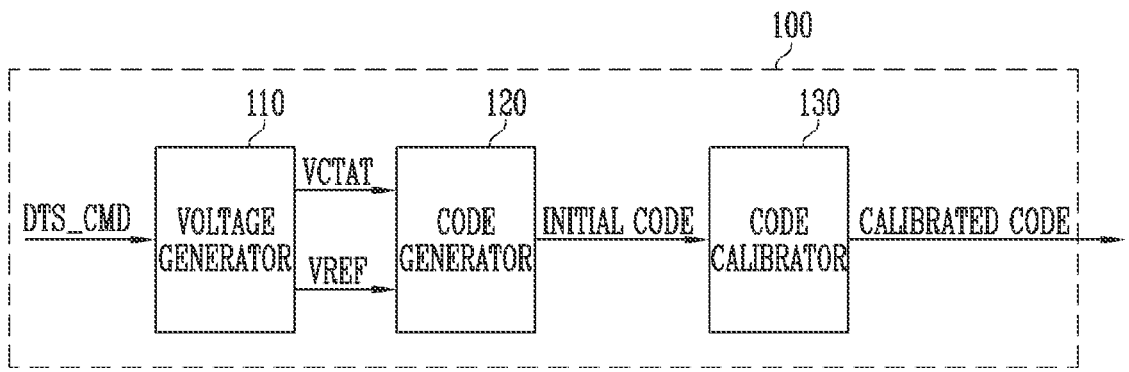
FIG. 3 is a diagram illustrating a temperature sensor according to an embodiment.

Meanwhile, FIGS. 2 and 3 illustrate a configuration in which the main voltage generator 1220 is separated from a voltage generator 110 shown in FIG. 3 to be described later. However, this configuration corresponds to one embodiment. According to another embodiment, the main voltage generator 1220 may be configured to include the voltage generator 110.

The page buffer group 1230 may include first to nth page buffers PB1 to PBn. The first to nth page buffers PB1 to PBn may be coupled to the memory cell array 1100 through the first to nth bit lines BL1 to BLn, respectively. The first to nth page buffers PB1 to PBn may operate in response to the control of the control logic 1300. More specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or may sense a voltage or a current of the bit lines BL1 to BLn during a read or verify operation.

More specifically, during a program operation, the first to nth page buffers PB1 to PBn may transfer data DATA received through the input/output circuit 1250 to selected memory cells through the first to nth bit lines BL1 to BLn when a program pulse is applied to the selected word line. Memory cells of the selected page may be programmed according to the transferred data DATA. A memory cell coupled to a bit line to which a program permission voltage (for example, a ground voltage) is applied may have an increased threshold voltage. A threshold voltage of a memory cell coupled to a bit line to which a program inhibition voltage (for example, a power voltage) is applied may be maintained. During a program verify operation, the first to nth page buffers PB1 to PBn may read page data from the selected memory cells through the first to nth bit lines BL1 to BLn.

During a read operation, the first to nth page buffers PB1 to PBn may read the data DATA from the memory cells of the selected page through the first to nth bit lines BL1 to BLn and output the read data DATA to the input/output circuit 1250 in response to control of the column decoder 1240.

During an erase operation, the first to nth page buffers PB1 to PBn may float the first to nth bit lines BL1 to BLn.

The column decoder 1240 may transfer data between the input/output circuit 1250 and the page buffer group 1230 in response to a column address CADD. For example, the column decoder 1240 may exchange data with the first to nth page buffers PB1 to PBn through data lines DL or may exchange data with the input/output circuit 1250 through column lines CL.

The input/output circuit 1250 may transfer a command CMD and an address ADDR received from the memory controller 2000 to the control logic 1300 or may exchange the data DATA with the column decoder 1240. According to an embodiment, a code regarding a temperature may be transferred to the memory controller 2000 through the input/output circuit 1250. A code may refer to a value of an internal temperature of the memory device 1000 which is measured by the temperature sensor 100.

The sensing circuit 1260 may generate a reference current in response to an allowable bit signal VRYBIT and compare a sensing voltage VPB received from the page buffer group 1230 with a reference voltage generated by the reference current to output a pass signal PASS or a fail signal FAIL during a read operation or a verify operation.

The control logic 1300 may control the peripheral circuit 1200 and the temperature sensor 100 by outputting the operation signal OPSIG, the row address RADD, the page buffer control signals PBSIGNALS, the allowable bit signal VRYBIT, and a temperature sensor control signal DTS_CMD in response to the command CMD and the address ADDR. In addition, the control logic 1300 may determine whether a verify operation has passed in response to the pass or fail signal PASS or FAIL and may identify temperature information of the memory device 1000 based on a code output from the temperature sensor 100.

The greater the number of bits is, the higher resolution the code CODE may have. Resolution may refer to a difference between an actual temperature and a temperature indicated by the generated code. For example, when resolution is low, when an actual internal temperature is 5° C., a code may be expressed as 0 and when an actual internal temperature is 10° C., a code may be expressed as 1. On the other hand, when resolution is high, when an actual internal temperature is 5° C., a code may be expressed as 0 and when an actual internal temperature is 10° C., a code may be expressed as 5. In other words, the higher resolution is, the greater a difference in code output at the same temperature difference may be. Accordingly, in high resolution, a difference between an actual temperature and a temperature indicated by the generated code may be small, and an actual internal temperature corresponding to the code may be more accurately expressed.

The temperature sensor 100 may generate a code corresponding to a temperature in response to the temperature sensor control signal DTS_CMD. The temperature sensor control signal DTS_CMD may be regularly generated at a predetermined cycle and may be generated according to performance of an internal operation of the memory device 1000.

Meanwhile, FIG. 2 illustrates a configuration in which the temperature sensor 100 is disposed in the memory device 1000. However, according to another embodiment, the temperature sensor 100 may be disposed outside the memory device 1000. The configuration and operations of the temperature sensor 100 are described with reference to FIG. 3.

FIG. 3 is a diagram illustrating the temperature sensor 100 according to an embodiment.

Referring to FIG. 3, the temperature sensor 100 may include the voltage generator 110, a code generator 120, and a code calibrator 130. An operation of each element of the temperature sensor 100 is described below.

The temperature sensor 100 may generate a code according to a temperature in response to the temperature sensor control signal DTS_CMD. The temperature sensor control signal DTS_CMD may be generated at a predetermined cycle and the temperature sensor 100 may receive the temperature sensor control signal DTS_CMD according to a predetermined cycle. Alternatively, the temperature sensor control signal DTS_CMD may be input to the temperature sensor 100 as the internal operation of the memory device 1000 is performed.

The voltage generator 110 may generate a temperature voltage and a reference voltage in response to the received temperature sensor control signal DTS_CMD. More specifically, the voltage generator 110 may generate a temperature voltage VCTAT determined according to a temperature and a reference voltage VREF having a constant voltage level independent of a change in temperature by using a voltage received from the main voltage generator 1220.

The temperature voltage VCTAT generated in the voltage generator 110 may correspond to a temperature and may be set to have a voltage level increasing or decreasing according to a change in temperature. The voltage generator 110 may include a transistor having a threshold voltage that varies according to a change in temperature or a resistor having a resistance value that varies according to a change in temperature. The voltage generator 110 may generate the temperature voltage VCTAT by using the transistor having the threshold voltage that varies according to a change in temperature or the resistor having the resistance value that varies according to a change in temperature.

Meanwhile, the reference voltage VREF generated in the voltage generator 110 may be set to have a constant voltage level independent of a change in temperature. More specifically, the reference voltage VREF may include a reference voltage VREF+ which has a relatively high voltage level and a reference voltage VREF− which has a relatively low voltage level. In addition, the voltage generator 110 may be formed to include a bandgap voltage generating circuit or a Widlar voltage generating circuit for having constant potential independent of a change in temperature.

The code generator 120 may generate an initial code based on the temperature voltage VCTAT and the reference voltage VREF received from the voltage generator 110. The temperature voltage VCTAT and the reference voltage VREF may be analog values including internal temperature information of the memory device 1000 and the initial code may be a digital value corresponding to a temperature. Accordingly, the code generator 120 may be embodied as an Analog to Digital Converter (ADC) that converts the temperature voltage VCTAT and the reference voltage VREF, which are analog signals, into an initial code, which is a digital signal.

Meanwhile, a difference in the initial code generated in the code generator 120 may occur during a process of providing a voltage from the main voltage generator 1220 to the voltage generator 110, a process of sensing a temperature and generating the temperature voltage VCTAT or the constant reference voltage VREF in the voltage generator 110, or a process of generating a code in the code generator 120. This difference may incur an error in which memory devices 1000 do not output the same code for the same temperature. The error may occur in two types, that is, an offset error and a gain error. These two types of errors may simultaneously occur in the memory device 1000. The error is described later with reference to FIG. 4.

The code calibrator 130 may generate a calibrated code which is obtained by calibrating the error that is incurred during a process of generating the first code. More specifically, the code calibrator 130 may generate the calibrated code based on the initial code received from the code generator 120 and a calibration factor with respect to the memory device 1000.

According to an embodiment, a calibration factor with respect to the memory device 1000 may be calculated in a test mode or at a test step. The test mode or the test step may be a preliminary operating mode or step performed to calculate the calibration factor based on a code output from the code generator 120 and to operate the temperature sensor 100 in a user mode.

The user mode may be a normal mode where the temperature sensor 100 generates a calibrated code after the calibration factor is calculated. The memory controller 2000 may perform an operation for calculating the calibration factor in the test mode.

The calibration factor may include a gain trim amount for performing gain calibration and an offset trim amount for performing offset calibration.

The gain trim amount may be a calibration factor for calibrating a gain error. The gain trim amount may be determined by comparing a difference between a first test code generated at a first temperature and a second test code generated at a second temperature with a reference value during the test step. The first test code and the second test code may be initial codes generated by the code generator 120 in the test mode.

The gain trim amount may be determined based on the reference value according to the first temperature and the second temperature. More specifically, the gain trim amount may be determined by comparing a difference between a first target code predetermined according to the first temperature and a second target code predetermined according to the second temperature with a difference between the first test code and the second test code. For example, when the first target code predetermined according to the first temperature is "$C_H$" and the second target code predetermined according to the second temperature is "$C_C$", a difference in target code may be "$C_C$-$C_H$" and when the first test code generated at the first temperature is "$D_H$" and the second test code generated at the second temperature is "$D_C$", a difference in test code may be "$D_C$-$D_H$". Accordingly, a gain trim amount a may be $(C_C-C_H)/(D_C-D_H)$.

The target code may be a code predetermined according to a temperature and may be a desirable value or a target value set to the temperature. The target code may be stored in a lookup table in the memory device 1000 or the memory controller 2000.

TABLE 1

| Temperature | Target Code |
| --- | --- |
| −40° C. | 511 |
| −39.6875° C. | 510 |
| −39.375° C. | 509 |
| −30° C. | 479 |

TABLE 1-continued

| Temperature | Target Code |
| --- | --- |
| 86.875° C. | 105 |
| 119.6875° C. | 0 |

Referring to Table 1, an embodiment of a lookup table is shown. An electronic device (for example, the memory device 1000) including the temperature sensor 100 may operate in a temperature range of from −40° C. to 120° C. and the temperature sensor 100 may sense a temperature in a temperature range of −40° C. to 120° C. Alternatively, a temperature range may be determined according to a specification of the temperature sensor 100 or a throttling temperature of an electronic device (for example, the memory device 1000).

The target code may be set to have resolution corresponding to 9 bits (i.e., a 512 code). When a temperature range is the same, when a code having the great number of bits is mapped, a difference in temperature according to a difference in code may be small. Further, when the code having the great number of bits is mapped to the same temperature range, the code may have high resolution. For example, when a temperature range is 160° C. and a 512 code corresponding to 9 bits is mapped, a difference in temperature according to a difference in code may be 160/512=0.3125(° C./Code).

Target codes may be inversely mapped to temperature. For example, a high target code of 511 may be mapped to a low temperature of −40° C., and a low target code of 0 may be mapped to a high temperature of 120° C. In addition, the code calibrator 130 may generate a calibrated code by performing a gain calibration to an initial code such that a generation range of the calibrated code in the user mode corresponds to a predetermined temperature range based on a gain trim amount determined in the test mode. The gain calibration may be performed by multiplying the initial code by the gain trim amount.

The offset trim amount may be a calibration factor for calibrating an offset error. The offset trim amount may be determined based on a first test code generated at a first temperature and a first target code predetermined according to the first temperature in the test mode. For example, when a first target code predetermined according to a first temperature is "$C_H$" and a first test code is "$D_H$", an offset trim amount may be "$C_H$-$D_H$".

The code calibrator 130 may generate a calibrated code by performing offset calibration to the initial code such that the calibrated code generated at the first temperature corresponds to the first target code predetermined according to the first temperature in the user mode based on the offset trim amount determined in the test mode. The offset calibration may be performed by adding the offset trim amount to the initial code.

The code calibrator 130 may generate the calibrated code by performing both the gain calibration and the offset calibration to the initial code. More specifically, the code calibrator 130 may generate the calibrated code based on Equation 1 below.

$$Y=(X-D_H)*\alpha+C_H, \text{ where } \alpha=(C_C-C_H)/(D_C-D_H) \quad [\text{Equation 1}].$$

Figure 7:
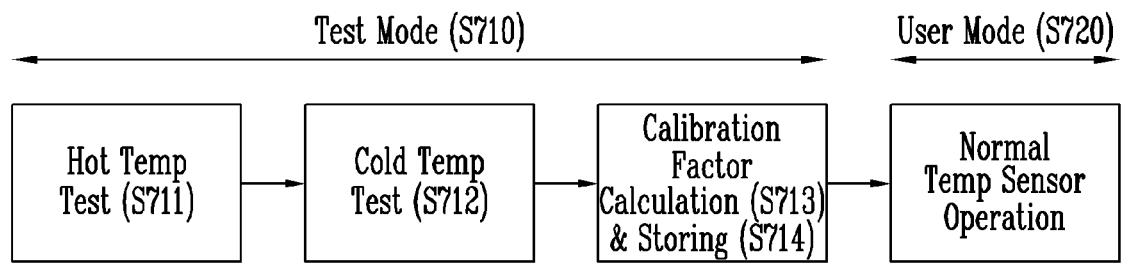
FIG. 7 is a diagram illustrating an order of operations of a temperature sensor according to an embodiment.

Here X may be the initial code and Y may be the calibrated code. $D_H$ may be the first test code generated at the first temperature, $D_C$ may be the second test code generated at the second temperature, $C_H$ may be a target code corresponding to the first temperature, and $C_C$ may be a target code corresponding to the second temperature. In other words, $C_H$ corresponds to the desired calibrated code that should be generated by the code calibrator 130 from the initial code $D_H$ generated by the code generator 120 at the first temperature, and $C_C$ corresponds to the desired calibrated code that should be generated by the code calibrator 130 from the initial code $D_C$ generated by the code generator 120 at the second temperature. Because $D_H$ and $D_C$ are generated by the code generator 120 during a test mode, the initial codes $D_H$ and $D_C$ are referred to as test codes. After determining a calibration factor for gain and/or offset, the temperature sensor 100 may operate in a user mode, as illustrated in FIG. 7.

Figure 4:
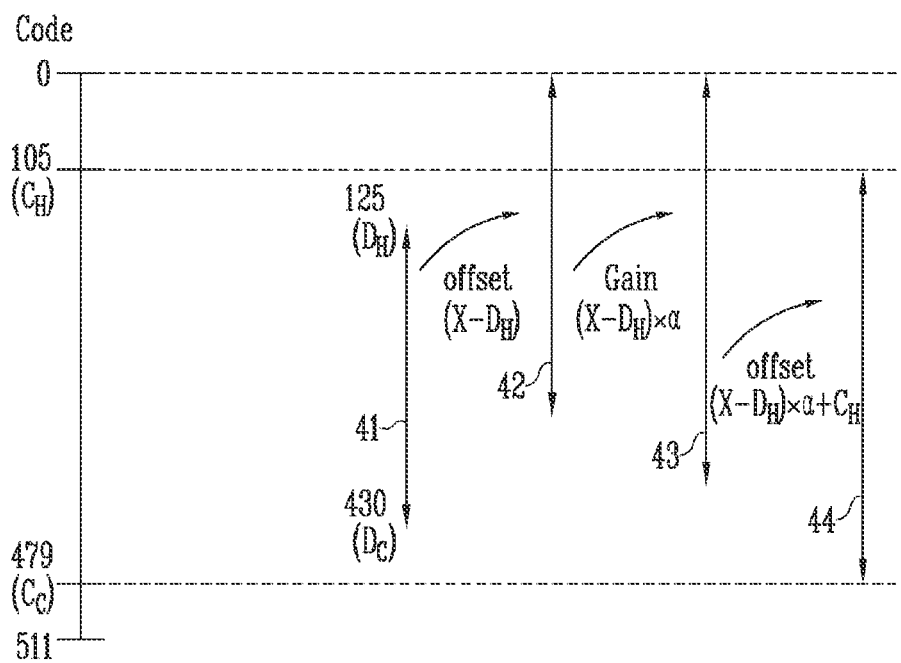
FIG. 4 is a diagram illustrating a method of calibrating a code according to an embodiment.

FIG. 4 is a diagram illustrating a method of calibrating codes according to an embodiment. For convenience of description, it is assumed that a code shown in FIG. 4 has resolution corresponding to a case where the number of bits is 9 in the context of the following description. However, embodiments are not limited thereto.

Referring to FIG. 4, first, second, third, and fourth graphs 41, 42, 43, and 44 are illustrated.

The first graph 41 may be a schematized form of an initial code generated at a first temperature to a second temperature. More specifically, the first graph 41 may be a form schematized based on the first test code $D_H$ generated at the first temperature and the second test code $D_C$ generated at the second temperature. The first test code $D_H$ and the second test code $D_C$ may be initial codes generated in the test mode.

The initial code may include an offset error and a gain error.

The offset error may occur when a code is moved by translation from a target code at a predetermined temperature by a predetermined value. For example, a target code corresponding to the first temperature is 105, but the initial code actually generated at the first temperature may be 125. Accordingly, the first graph 41 may correspond to a case where an offset error occurs. The gain error may occur when a difference in codes or a range of codes generated in a predetermined temperature range is formed to be smaller or greater than a difference in target codes or a range of target codes. For example, a difference in target codes at the first temperature to the second temperature is (479-105), but a difference in initial codes actually generated at the first temperature to the second temperature is (430-125). Accordingly, the first graph 41 may also correspond to a case where a gain error occurs.

The second graph 42 may be obtained by performing first offset calibration to the first graph 41. The first offset calibration may be for moving the first graph 41 by translation by subtracting the first test code $D_H$ from the initial code generated at the first temperature to the second temperature. For example, when the initial code output according to a temperature is X, the second graph 42 which is obtained by performing the first offset calibration may correspond to $(X-D_H)$.

The third graph 43 may be obtained by performing gain calibration to the second graph 42. The gain calibration may be for changing a difference in code by multiplying the second graph 42 and a gain trim amount a which is calculated by dividing a difference between the first target code $C_H$ and the second target code $C_C$ by a difference between the first test code $D_H$ and the second test code $D_C$. The third graph 43 obtained by performing gain calibration to the second graph 42 may correspond to $(X-D_H)*\alpha$. The first target code $C_H$ may be a target code which is mapped to correspond to the first temperature and the second target code $C_C$ may be a target code which is mapped to correspond to the second temperature.

The fourth graph 44 may be obtained by performing second offset calibration to the third graph 43. The second offset calibration may be for moving the third graph 43 by translation by adding the first target code $C_H$ corresponding to the first temperature to the third graph 43. The fourth graph 44 obtained by performing the second offset calibration to the third graph 43 may correspond to $(X-D_H)*\alpha+C_H$.

Figure 5:
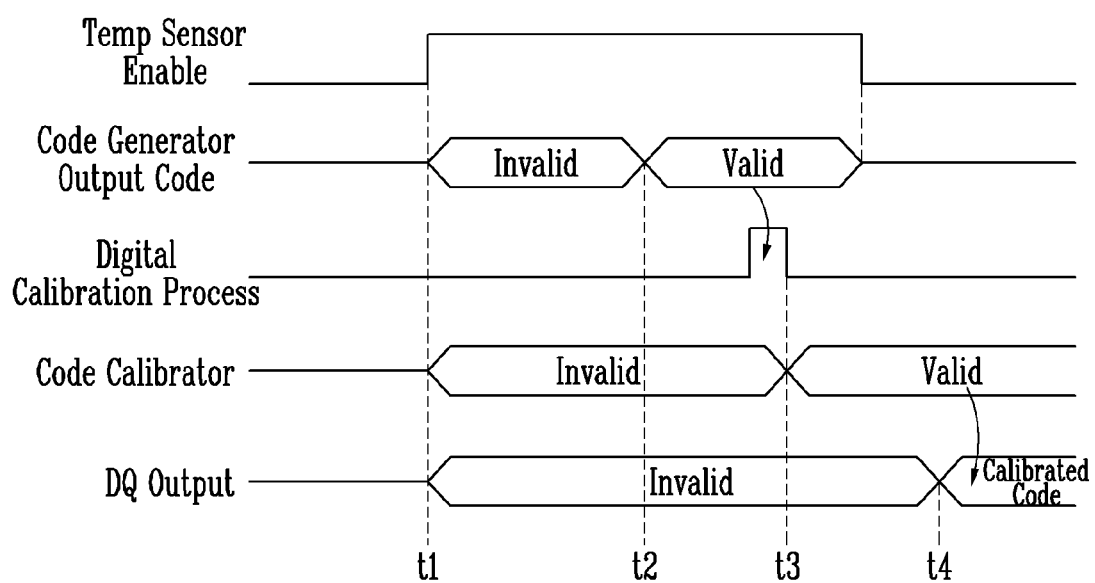
FIG. 5 is a timing diagram illustrating an operation timing of a temperature sensor according to an embodiment.

FIG. 5 is a timing diagram illustrating an operation timing of the temperature sensor 100 according to an embodiment.

Referring to FIG. 5, at a first time t1, the temperature sensor 100 may perform operations of receiving the temperature sensor control signal DTS_CMD, sensing a temperature in response to the temperature sensor control signal DTS_CMD, and generating a code based on the sensed temperature. More specifically, the voltage generator 110 may start to operate from the first time t1 and generate a temperature voltage and a reference voltage. The code generator 120 may generate an initial code at a second time t2.

The initial code generated by the code generator 120 may be calibrated by the code calibrator 130 to generate a calibrated code. More specifically, after the second time t2, the code calibrator 130 may perform operations of receiving the initial code generated by the code generator 120 and calibrating the received initial code. At a third time t3, the code calibrator 130 may generate the calibrated code based on a calibration factor.

Thereafter, at a fourth time t4, the calibrated code may be stored in the memory device 1000 or may be transferred to the memory controller 2000.

Figure 6:
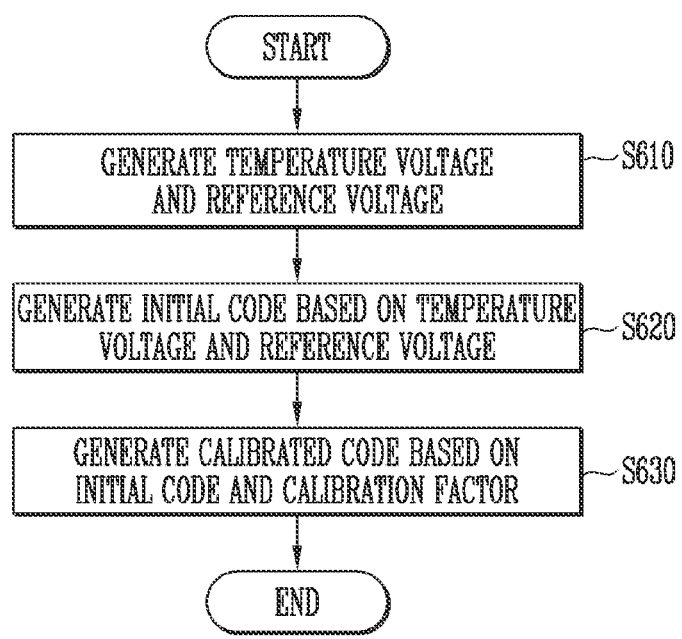
FIG. 6 is a flowchart illustrating a method of controlling a temperature sensor according to an embodiment.

FIG. 6 is a flowchart illustrating a method of controlling the temperature sensor 100 according to an embodiment.

The temperature sensor 100 may generate a code according to a temperature in response to the temperature sensor control signal DTS_CMD.

At step S610, the temperature sensor 100 may generate a temperature voltage and a reference voltage. More specifically, the temperature sensor 100 may generate the temperature voltage having a voltage level determined according to a temperature and the reference voltage having a constant voltage level independent of a change in temperature. The temperature voltage may correspond to a temperature and may be set to have a voltage level increasing or decreasing according to a change in temperature. The reference voltage may have a constant voltage level independent of a change in temperature and may include a reference voltage VREF+ which has a relatively high voltage level and a reference voltage VREF− which has a relatively low voltage level.

At step S620, the temperature sensor 100 may generate an initial code based on the temperature voltage and the reference voltage. More specifically, the temperature voltage and the reference voltage may be analog values including internal temperature information of the memory device 1000, and the initial code may be a digital value corresponding to a temperature. In other words, the temperature sensor 100 may convert the temperature voltage and the reference voltage which are analog signals into a code which is a digital signal.

At step S630, the temperature sensor 100 may generate a calibrated code based on the initial code and a calibration factor. More specifically, the temperature sensor 100 may generate the calibrated code by calibrating an error incurred during a process of generating the initial code by using the calibration factor.

For example, the temperature sensor 100 may generate the calibrated code by performing gain calibration to the initial code based on a gain trim amount determined by comparing a reference value with a difference between a first test code generated at the first temperature and a second test code generated at the second temperature such that a generation range of the calibrated code corresponds to a predetermined temperature range. Alternatively, the temperature sensor 100 may generate the calibrated code by performing offset calibration to the initial code such that the calibrated code generated at the first temperature corresponds to a first target code predetermined according to the first temperature. For an embodiment, the temperature sensor 100 performs both a gain calibration and an offset calibration to the initial code.

FIG. 7 is a diagram illustrating an order of operations of the temperature sensor 100 according to an embodiment.

Referring to FIG. 7, the order of operations of the temperature sensor 100 may include a test mode S710 and a user mode S720.

The test mode S710 may be a preliminary operating mode performed to calculate the calibration factor based on initial codes generated by the temperature sensor 100 and to operate the temperature sensor 100 in the user mode S720. In other words, an operation and an arithmetic operation to calculate the calibration factor may be performed in the test mode S710.

At step S711, the temperature sensor 100 may generate the first test code $D_H$ at a first temperature. A test code may refer to an initial code used to determine a calibration factor. More specifically, the memory controller 2000 may transfer the temperature sensor control signal DTS_CMD to the temperature sensor 100 to calculate the calibration factor and the temperature sensor 100 may generate the first test code at the first temperature in response to the received temperature sensor control signal DTS_CMD. One temperature which is determined as a relatively high temperature between a temperature of the memory device 1000 and a temperature of the memory system 10000 may be selected as the first temperature, and the selected temperature may be used as a test temperature. For example, when the memory device 1000 and the memory system 10000 perform a normal operation, a temperature range of from −40° C. to 120° C. may be formed and 87° C. may be selected as a first temperature. The memory device 1000 and the memory controller 2000 may store the generated first test code $D_H$.

At step S712, the temperature sensor 100 may generate a second test code at a second temperature. More specifically, the memory controller 2000 may transfer the temperature sensor control signal DTS_CMD to the temperature sensor 100 to calculate the calibration factor and the temperature sensor 100 may generate the second test code at the second temperature in response to the received temperature sensor control signal DTS_CMD. One temperature which is determined as a relatively low temperature between a temperature of the memory device 1000 and a temperature of the memory system 10000 may be selected as the second temperature, and the selected temperature may be used as a test temperature. For example, when the memory device 1000 and the memory system 10000 perform a normal operation, a temperature range of from −40° C. to 120° C. may be formed and −30° C. may be selected as a second temperature. The memory device 1000 and the memory controller 2000 may store the generated second test code $D_C$.

At steps S711 and S712, the memory controller 2000 may control an operation of the memory device 1000 or the memory system 10000 to change a temperature of the memory device 1000 or the memory system 10000.

At steps S713 and S714, the memory controller 2000 may calculate and store the calibration factor based on the first test code and the second test code. The calibration factor may include both of an offset trim amount to calibrate an offset error and a gain trim amount to calibrate a gain error. More specifically, the memory controller 2000 may perform calculation by comparing a code mapped according to a temperature with the first test code and the second test code. For example, when a temperature range is formed between −40° C. and 120° C. during a normal operation of the memory device 1000 or the memory system 10000, a code value of 511 may be mapped to −40° C. and a code value of 0 may be mapped to 120° C. The code mapped to correspond to a temperature may be a code which the temperature sensor 100 aims to output, that is, a target code. The target code may be mapped according to a temperature by the order-preserving map. For example, a code value of 0 may be mapped to −40° C. and a code value of 511 may be mapped to 120° C.

The user mode S720 may be a normal mode where the temperature sensor 100 generates a calibrated code after the calibration factor is calculated. Because the user mode S720 has been described above with reference to FIG. 6, the description of the user mode S720 is omitted here to avoid repetitive descriptions.

Figure 8:
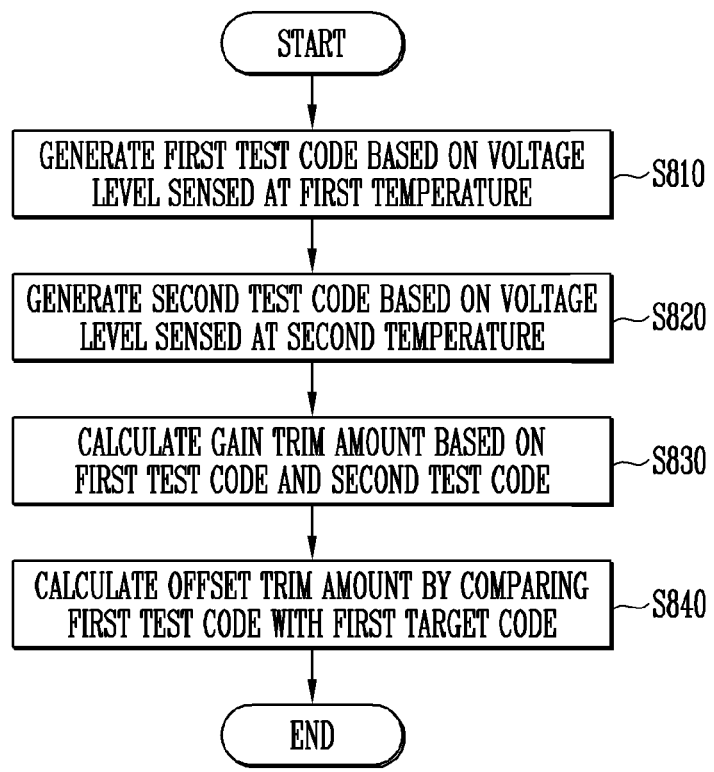
FIG. 8 is a flowchart illustrating a test mode of a temperature sensor according to an embodiment.

FIG. 8 is a flowchart illustrating a test mode of the temperature sensor 100 according to an embodiment.

At step S810, the temperature sensor 100 may generate a first test code based on a voltage level sensed at a first temperature.

At step S820, the temperature sensor 100 may generate a second test code based on a voltage level sensed at a second temperature lower than the first temperature.

At step S830, the temperature sensor 100 may calculate ranges of the first test code and the second test code, and may calculate a gain trim amount based on the calculated ranges. More specifically, the temperature sensor 100 may calculate the gain trim amount by comparing the calculated ranges based on a difference between a first target code predetermined according to the first temperature and a second target code predetermined according to the second temperature.

At step S840, the temperature sensor 100 may calculate an offset trim amount by comparing the first test code with the first target code predetermined according to the first temperature.

After step S840, the test mode of the temperature sensor 100 may further include a step of generating a code which is calibrated based on the gain trim amount and the offset trim amount.

According to embodiments of the present disclosure, a temperature sensor capable of calibrating errors that occur in a process of generating a code according to a temperature and a method of controlling the temperature sensor may be provided.

What is claimed is:

1. A memory device for performing an internal operation on an included memory cell, the memory device comprising:
a voltage generator suitable for measuring an internal temperature of the memory device and generating a temperature voltage that has a voltage level determined according to the internal temperature and a reference voltage that has a constant voltage level independent of a change in temperature;

a code generator suitable for generating an initial code based on the temperature voltage and the reference voltage; and a code calibrator suitable for generating a calibrated code based on the initial code and a calibration factor, wherein the calibrated code is generated by performing a gain calibration and an offset calibration, wherein the code generator performs the gain calibration to generate the calibrated code such that a generation range of the calibrated code corresponds to a predetermined temperature range, and wherein the code generator performs the offset calibration to generate the calibrated code such that the calibrated code generated at a first temperature corresponds to a first target code predetermined according to the first temperature.

2. The memory device of claim 1, wherein the code calibrator suitable for generating the calibrated code by performing the gain calibration based on the calibration factor that is determined by comparing a reference value with a difference between a first test code generated at a first temperature and a second test code generated at a second temperature.

3. The memory device of claim 2, wherein the reference value refers to a difference between a first target code predetermined according to the first temperature and a second target code predetermined according to the second temperature.

4. The memory device of claim 2, wherein the gain calibration is performed by multiplying the initial code and a gain trim amount of the calibration factor such that the generation range of the calibrated code corresponds to the predetermined temperature range.

5. The memory device of claim 1, wherein the offset calibration is performed by adding the calibration factor, which is determined by comparing a first test code and the first target code, to the initial code.

* * * * *